(12) United States Patent
Shepherd (10) Patent No.: US 8,136,673 B2
(45) Date of Patent: Mar. 20, 2012

(54) GRIT ELEVATOR

(75) Inventor: Nigel R C Shepherd, Herefordshire (GB)

(73) Assignee: The Haigh Engineering Company Ltd., Herefordshire (GB)

( * ) Notice: Subject to any disclaimer, the term of this patent is extended or adjusted under 35 U.S.C. 154(b) by 568 days.

(21) Appl. No.: 12/290,838

(22) Filed: Nov. 4, 2008

(65) Prior Publication Data

US 2009/0145837 A1 Jun. 11, 2009

(30) Foreign Application Priority Data

Nov. 14, 2007 (GB) .................................. 0722387.8
Sep. 5, 2008 (GB) .................................. 0816289.3

(51) Int. Cl.
*B01D 33/00* (2006.01)
(52) U.S. Cl. ...................................................... 210/400
(58) Field of Classification Search .................. 210/400, 210/403, 404
See application file for complete search history.

(56) References Cited

U.S. PATENT DOCUMENTS

| | | | |
|---|---|---|---|
| 1,844,383 A | 2/1932 | Davis | 209/348 |
| 2,286,332 A | 6/1942 | Bleyer | |
| 4,138,011 A | 2/1979 | Lapeyre | |
| 4,242,205 A * | 12/1980 | Hirs | 210/400 |
| 4,430,812 A | 2/1984 | Van der Ent | 37/69 |
| 5,618,415 A | 4/1997 | Johnson, Jr. | 210/158 |
| 6,709,578 B2 | 3/2004 | Wilcher | |
| 2003/0080035 A1 | 5/2003 | Wilcher | |

FOREIGN PATENT DOCUMENTS

| | | |
|---|---|---|
| EP | 0 038 554 | 10/1981 |
| EP | 0 728 512 | 8/1996 |
| EP | 0 810 333 | 12/1997 |
| EP | 1 046 751 | 10/2000 |
| GB | 1 558 086 | 12/1979 |
| GB | 2 275 622 | 9/1994 |
| GB | 2 403 438 | 1/2005 |
| GB | 2407 782 | 5/2005 |
| WO | 01/30481 | 5/2001 |
| WO | 2005/097290 | 10/2005 |

OTHER PUBLICATIONS

Great Britain Search Report dated Dec. 13, 2007.
Great Britain Search Report dated Sep. 2, 2008.
Great Britain Search Report dated Nov. 25, 2008.
U.K. search report dated Oct. 27, 2008.
Office Action dated Jun. 21, 2011 in co-pending U.S. Appl. No. 12/229,853.
Office Action dated Aug. 25, 2011 in co-pending U.S. Appl. No. 12/229,853.
European Communication dated Jan. 22, 2009 in co-pending foreign patent application No. EP 08163093.1.

* cited by examiner

*Primary Examiner* — Fred Prince (74) *Attorney, Agent, or Firm* — Nields, Lemack & Frame, LLC (57) ABSTRACT

A grit elevator (30) including a plurality of solid screens (104) in the form of a rotatable endless belt, one or more grit collectors (116) on the interior of the endless belt, and a grit inlet (172) leading to the interior of the endless belt.

12 Claims, 13 Drawing Sheets

GRIT ELEVATOR

The present invention relates to means for removing grit after it has been separated from a flow of water, for example, by means of a grit separator arranged to separate grit from wastewater.

The term "grit" refers generally to inorganic settleable solids including sand, gravel and cinders as well as eggshells, seeds and large organic particles such as food waste. The amount of grit entering a treatment plant may typically be 1 to 4 cubic feet per 1 million gallons of wastewater.

Wastewater entering a sewage plant will generally include grit which has to be removed towards the beginning of water treatment as it can otherwise result in mechanical wear to equipment, such as the impellers of lift pumps, and can accumulate to form solid masses which can be very difficult to remove.

Typically a screen used to remove particulate matter will get damaged by grit and stones and this will cause premature failures which can be expensive and disruptive. Such screens typically have tracks around which the screening panels pass along which can become worn. Sealing between panels and between panels and the frame becomes dilapidated. Panels, especially if they are made from plastic, can break or deform if large stones or bricks fall back onto the panels or mechanisms.

Historically grit separation used to, and even in some occasions still does today, take place between a bar screen acting as an interceptor screen and a fine screen with 6 mm perforations or even less (3 mm, 2 mm or 1 mm). These is because bigger stones and rag would be removed from the water flow and allow traditional grit removing plant to extract the small stones and grit prior to entry to the fine screens. It is considered difficult to remove grit when there is rag or big stones in the waste water flow.

One known approach to grit removal is to use long channel grit settling chambers. The wastewater is introduced into a chamber which is dimensioned to reduce the flow velocity to about 0.3 m/s and long enough to provide that grit to a required mesh size will settle out to the bottom of the chamber. The grit that settles out of the water flow then has to be removed for disposal.

In one such arrangement wastewater is passed along a first grit settling chamber until a certain amount of grit has accumulated whereupon the wastewater is diverted to a second grit settling chamber and grit that has settled in the first chamber is cleaned out by hand or mechanically. Other arrangements include a single grit settling chamber with automatic grit rakes that operate intermittently to remove grit without the need to divert the wastewater during the cleaning operation.

The present invention seeks to provide an apparatus for removing grit which can be operated continuously and without the need to divert wastewater flow into different settling tanks. Accordingly, the present invention provides grit elevator as claimed in the claims. In particular, a grit elevator according to the present invention includes a plurality of solid screens in the form of a rotatable endless belt, one or more grit collectors fixed to the interior of the endless belt, and a grit inlet leading to the interior of the endless belt.

The endless belt can be as a known bandscreen filter but with solid panels instead of filter panels. A preferred form of grit elevator is substantially as disclosed in co-pending GB application GB 0716727.3 but with the screening panels replaced by solid panels.

Grit removed from the water flow and led to the grit elevator settles to the bottom of the apparatus and is then lifted upwards by the grit collectors as the endless belt rotates. At the top of the apparatus the grit falls into a outlet channel as the grit collector inverts at the top of the endless belt.

The grit collectors may include a plate, optionally arcuate, protruding inwardly from the endless belt.

The grit elevator may include a pair of spaced-apart, endless drive chains, a plurality of spaced-apart screen-supporting members each spanning between the drive chains, and a plurality of screens each of which is held in position by being engaged with, but not attached to, a respective pair of the screen-supporting members, only. Each screen-supporting member may include a pair of spaced-apart, at least part-cylindrical, screen engaging means.

Each screen-panel engaging means may include a split cylindrical tube which is removably attached to a plate engaged with the slot.

Each of said screens may include a pair of screen-supporting member engaging means each engageable with a screen engaging means and, optionally, each screen-supporting member engaging means may include a channel and in which in which, preferably, each channel may include two opposed, generally planar side walls which diverge in the direction away from screen. One of the sidewalls may be a flange of a plate which is removably fastened to screen.

The plurality of screens may alternate with articulating links, one or more of the links including a grit collector.

The grit elevator of the present invention can be used with any suitable grit separator that separates grit from the water and can be arranged to feed the grit to the interior of the grit elevator of the present invention.

The present invention may be fed by the novel grit separator described in this application which includes a first chamber, a grit chamber in fluid communication with, and downstream of, the first chamber, the grit chamber having a downward sloping bottom and a pair of weirs which converge in the downstream direction, the weirs being arranged to accept wastewater from the first chamber. This grit separator may be used independently of the grit elevator of the present invention. In use, the wastewater enters the first chamber which is dimensioned to provide a large flow velocity drop to the water which then flows to and between the weirs of the grit chamber. The grit settles out between the weirs due to the dwell time provided by the weirs.

The converging weirs provide that the flow velocity of the wastewater increases downstream sufficient to roll the accumulated grit along the downwardly sloping floor of the grit chamber to a grit elevator without manual or mechanical intervention.

The grit chamber may include a closable exit defined by an exit frame at the downstream end of the chamber with the downstream ends of the weirs sealed to the exit frame. This provides that the exit can be closed to isolate the end of the grit chamber between the weirs.

Wastewater that passes over the weirs is led past the outside of the grit elevator. Wastewater carrying the grit into the grit elevator passes through the grit elevator to join the wastewater that has passes over the weirs.

In one arrangement the grit and stones flow with some screenings into the grit elevator which is arranged to provide that the grit and stones drop into the grit collectors and enabling the rag to pass through with the waste water. The majority of the waste water is allowed to flow over a weir holding back the grit and stones. The flow that passes over the weir passes around the grit elevator and combines with the flow through the grit elevator, less grit and stones, so that the main flow of waste water can be processed by a fine screen.

Grit and stones generally move along a channel with a 1 in 40 slope, for example, where the velocity of the flow is approximately 1 meter per second and this enables the sizing of the channel to be determined. The length of the reducing channel is determined by ensuring that at the operating flow rates the depth of the flow across the overflow weir is between a range of depths say 10 to 25 mm which allows screening material to flow over the weir with the main flow.

The grit and stones which pass into the grit elevator fall out of the flow because the velocity drops as the inside dimensions are much greater than the aperture through which the grit and stones entered. The grit and stones drop into the grit collectors which are preferably smooth in profile allowing rag to gently flow on through the exit to the grit band. The velocity may be typically 0.25 meters/second but this will vary according to the flow rate entering the headworks.

A preferred way to remove grit from a flow of water for providing grit to the grit elevator of the present invention is to pass the waste water down a conduit at a flow rate which causes grit of at least a desired density to fall to the bottom of the conduit and be moved by the flow along the bottom. By providing an outlet at the bottom of the conduit leading to a water tight grit elevator, ie one which does not allow water to flow through it, the grit passes down the outlet to the grit elevator whilst the water and lighter solid contents flow onward to screening filters in the usual way.

In any of the embodiments, the grit elevator can run slowly and continuously but it is preferable to run it intermittently, for example, for fifteen seconds every 15 minutes at a linear speed of 1 meter per minute. The speeds and running times will be dependent on the likely intake of grit and stones for a given installation.

The process described above relates to pumped flow. It should be borne in mind that flows will vary according to the particular installation and the calculations need to be undertaken to ensure that the channel widths, depths, satisfy the characteristic for the process to be operational when grit and stones present themselves. This is likely to be when flows are high during storms. The intermittent cycling of the grit elevator may be regulated dependent on the flow rate.

Embodiments of grit elevators according to the present invention, and grit separators useful with the present invention, will now be described, by way of example only, with reference to accompanying drawings, of which.

Figures 1, 2:
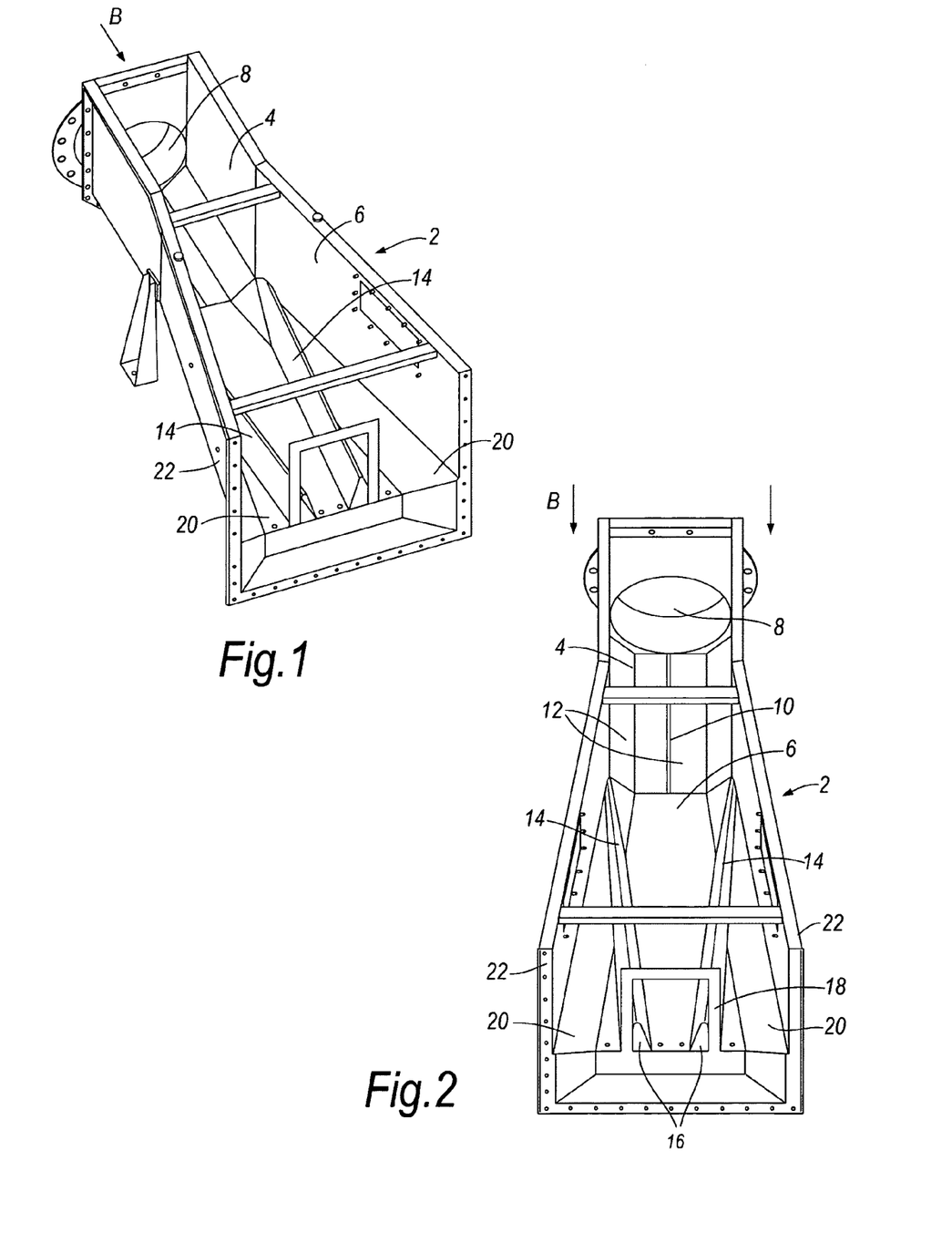
FIG. 1 is a perspective view of a grit separator useful with the present invention (exit shutter omitted for clarity)
FIG. 2 is an end view of the embodiment of FIG. 1.

Referring to FIG. 1, a grit separator 2 includes two interlinked chambers, namely a first chamber 4 and a grit chamber 6 in series in the downstream direction B. The upstream end of the first chamber 4 has an inlet port 8 in the form of a flanged conduit, but could equally be a trough connection (or any other inlet). The first chamber has a floor including a central, horizontal, planar portion 10 which is flanked by a pair of angled side portions 12. The slope guides settling grit towards the central portion 10.

The grit separator 6 has a pair of weirs 14 which converge in the downstream direction B. The upstream ends of weirs 14 are shaped so the edges facing sides are coincident with respective edges of the side portions 12 of the floor of the first chamber 4. The downstream ends 16 of the weirs are sealed to an exit frame 18.

The grit chamber 6 has a transverse cross-section which increases in the downstream direction. Troughs 20 are defined between the weirs 12 and the sidewalls 22 of grit chamber 6.

Figure 3:
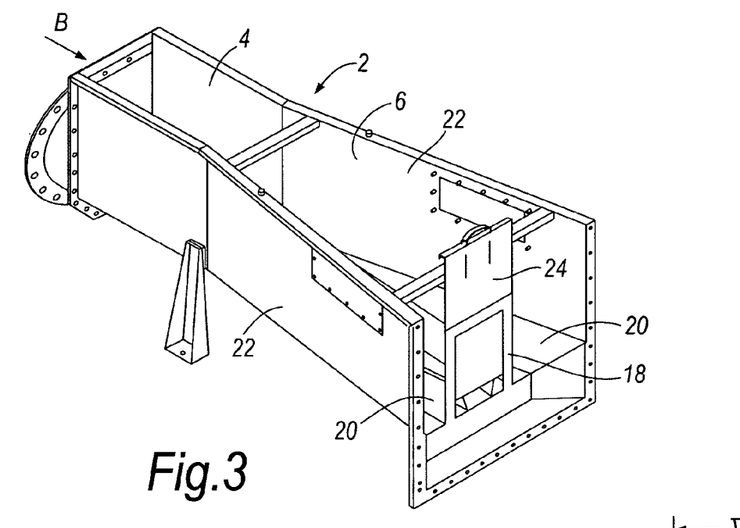
FIG. 3 is a further perspective view of the grit separator of FIGS. 1 and 2 (with the exit shutter shown)

As shown in FIG. 3, a shutter 24 can be moved to open and close the exit defined by the exit frame 18.

Figure 4:
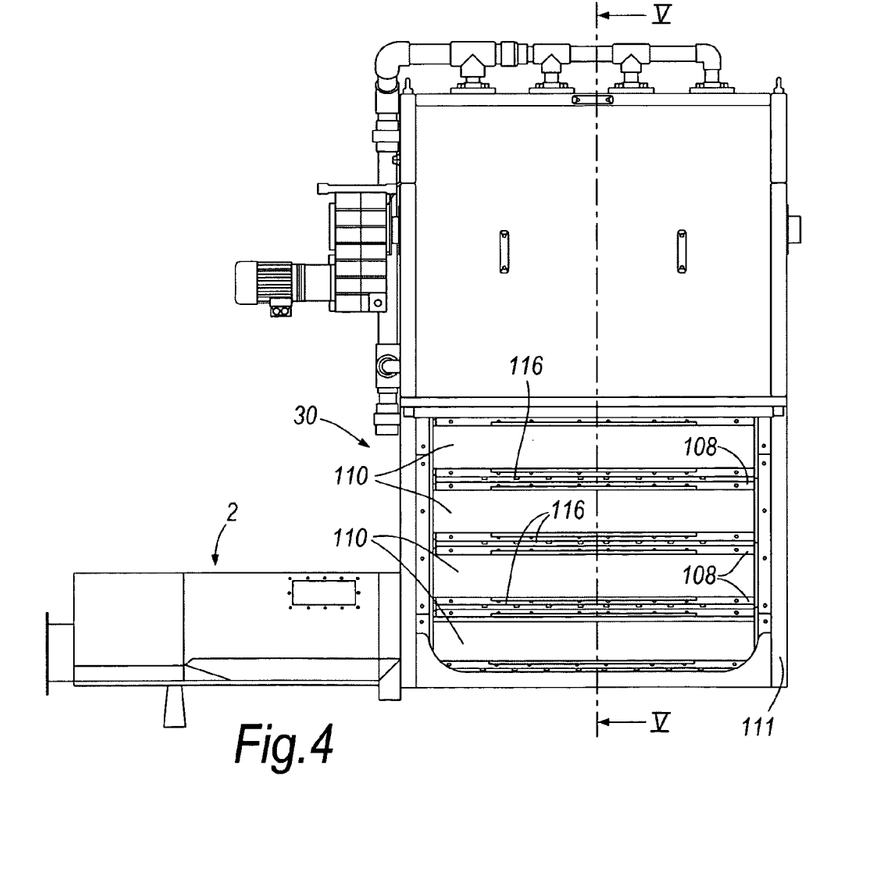
FIG. 4 is a side sectional view of a grit elevator according to the present invention coupled to the grit separator of FIG. 1.

Referring now to FIG. 4, there is shown a cross-sectional view of the grit separator 2 coupled to a grit elevator 30 according to the present invention so the grit can be carried to the interior of the grit elevator 30.

The grit elevator is as the bandscreen of co-pending application GB 0716727.3 except solid panels 110 are used instead of screening filter panels and there is rear panel 111 including an exit aperture at its lower end (not shown) to allow waste water to flow across the interior of the grit elevator 30.

The grit elevator 30 has links 108 which support the panels 110 and are driven by end chains (not shown). Each has a projecting ledge 116, constituting a grit collector, which carries grit that has been carried into the grit elevator 30 upwards for disposal. The grit elevator 30 need not operate continuously but can be operated to provide a part-rotation and intermittently when a predetermined amount of grit is expected to have been deposited since the last part-rotation.

The grit elevator 30 may be used with means to separate and feed grit into its interior other than the grit remover 2 of the present invention.

The exemplary grit elevator 30 will now be described in more detail with reference to FIGS. 5 to 14.

Figure 5:
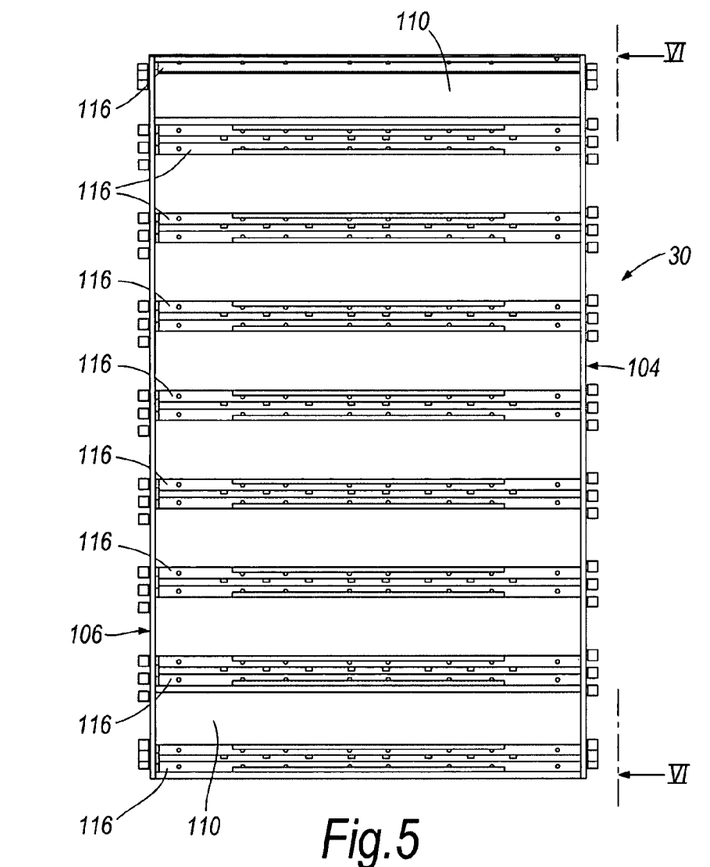
FIG. 5 is a diagrammatic front view of a grit elevator of FIG. 4.
Figure 6:
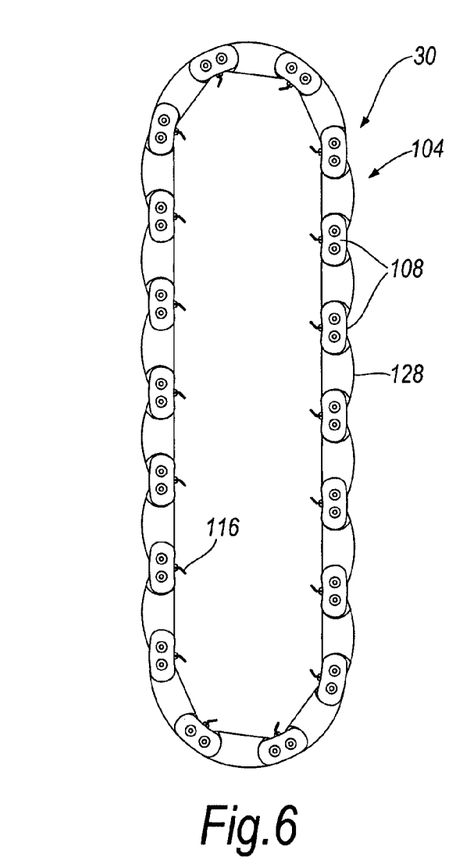
FIG. 6 is a diagrammatic side view of the grit elevator of FIG. 4.
Figure 9:
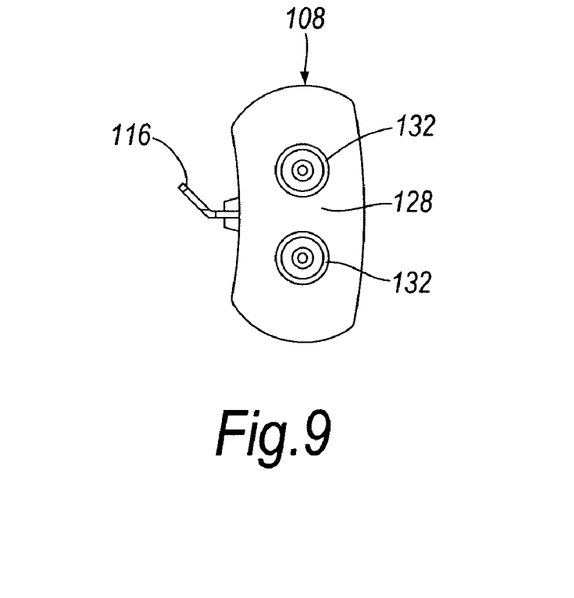

Referring to FIGS. 5 and 6, there is shown a grit elevator 30 according to the present invention. It comprises a pair of spaced-apart, endless drive chains 104, 106 to which are attached links 108, constituting screen-supporting members, each of which spans the gap between the drive chains 104 and 106. Between each consecutive pair of links 108 is a solid screen 110 each of which is supported in position in the grit elevator 30 by respective pair of links 108 but which, as will be shown in more detail below, are not attached to either the links 108 or the drive chains 104, 106. Referring now to FIGS. 7 to 10 there is shown in more detail a link 108. It includes an elongate base plate 114 to which is attached an elongate grit collector 116 which extends the width of the plate 114 and stands out from it at an angle as best seen in FIG. 9.

Figure 7:
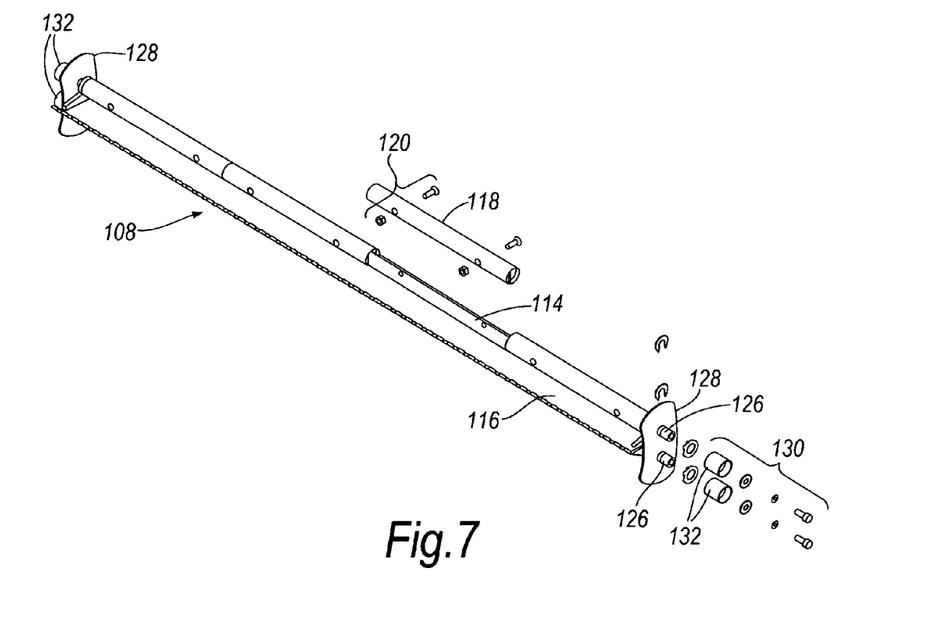
FIG. 7 is a diagrammatic exploded isometric front view of the screen-supporting member of the grit elevator of FIG. 4.
Figure 8:
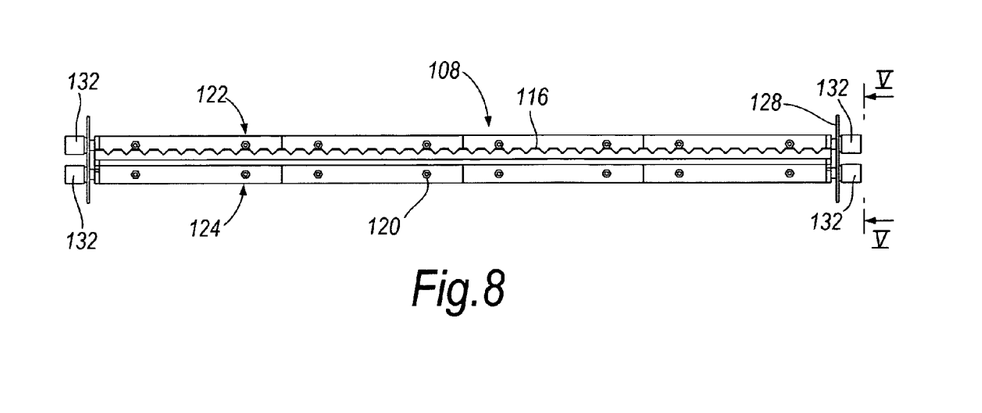
FIGS. 8 to 10 are diagrammatic front, end and sectional views, respectively, of the screen-supporting member of FIG. 7.

Split cylindrical tubes 118 are bolted onto the plate 114 at both sides of the grit collector 116 by bolts 120 to collectively form a pair of screen panel engaging members 122 and 124.

Figure 10:
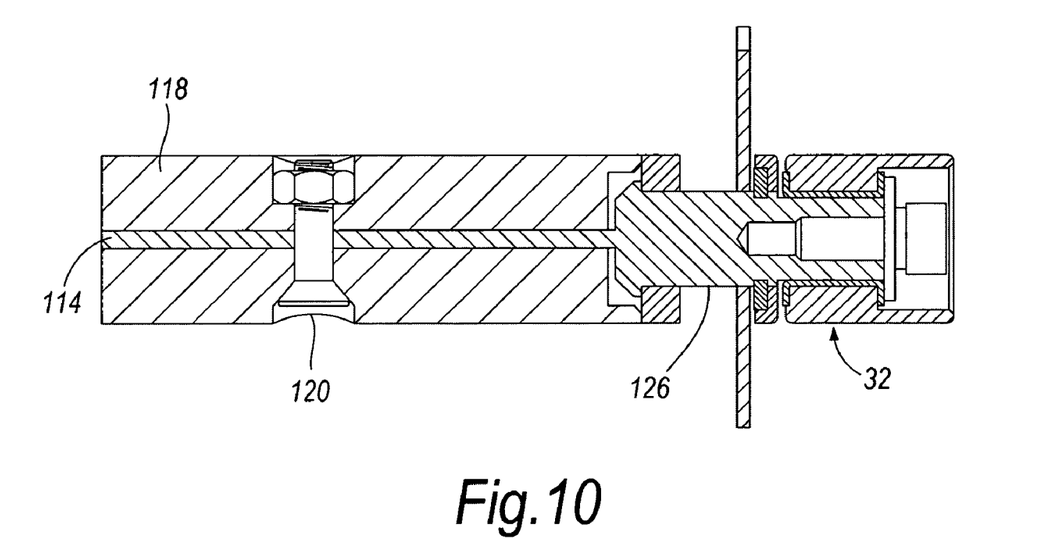

Referring in particular to FIG. 10, the split tubes 118 at the ends of the link 108 extend beyond the ends of plate 114. Spigots 126 are attached to the outer ends of the end tubes 118 on which are mounted side plates 128 and roller assemblies 130 each including a roller 132.

Figure 11:
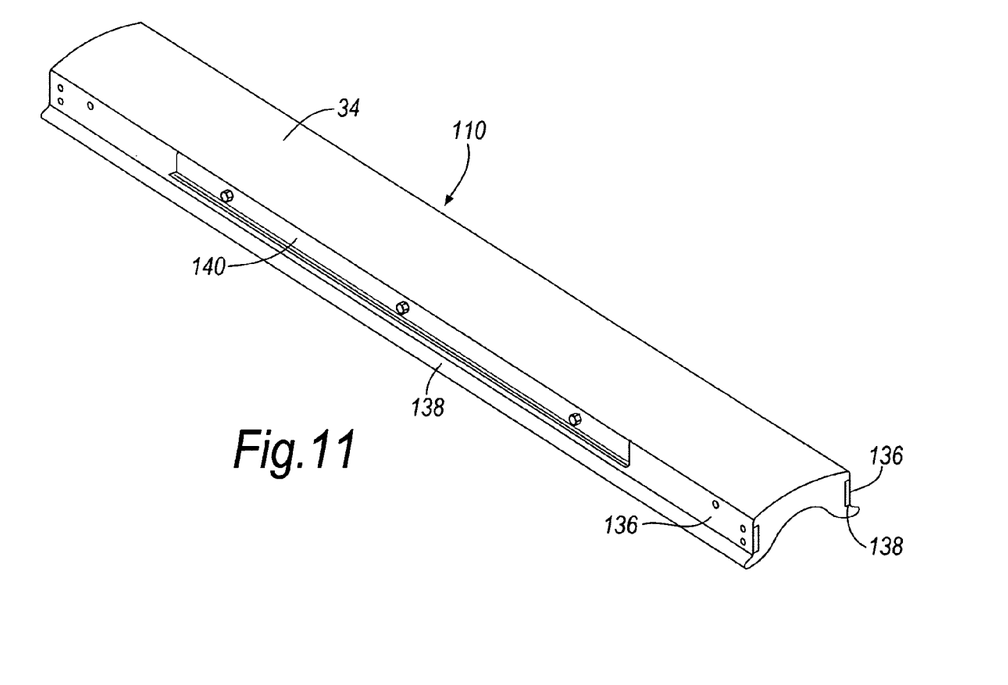
FIG. 11 is a diagrammatic isometric view of a screen of the grit elevator of FIG. 4.
Figure 12:
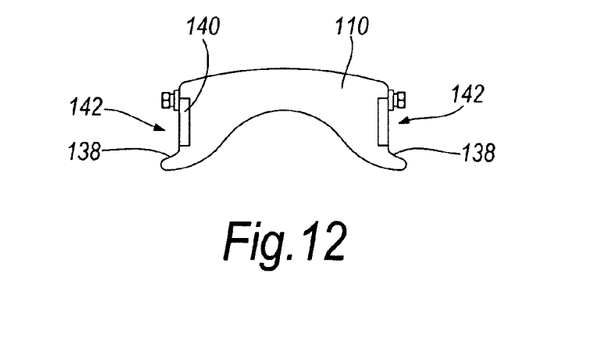
FIG. 12 is a diagrammatic end view of the screen of FIG. 11.

Referring now to FIGS. 11 and 12, the screen 110 is shown in more detail. Sidewalls 136 extend vertically downward (in the orientation illustrated) from the screening area along each longitudinal edge and terminate in a lip 138 that extends downwardly and outwardly from vertical sidewall. Bolted on to each sidewall 136 is a bracket 140 which, with the lip 130 and a portion of the sidewall 136 between the lip 138 and the bracket 140, defines a channel 142 (constituting a screen-supporting member engaging means) engageable by the link 108. The diverging form of the sidewalls of the channel 142 means it is engageable with a link 108 without being attached to it.

Figure 13:
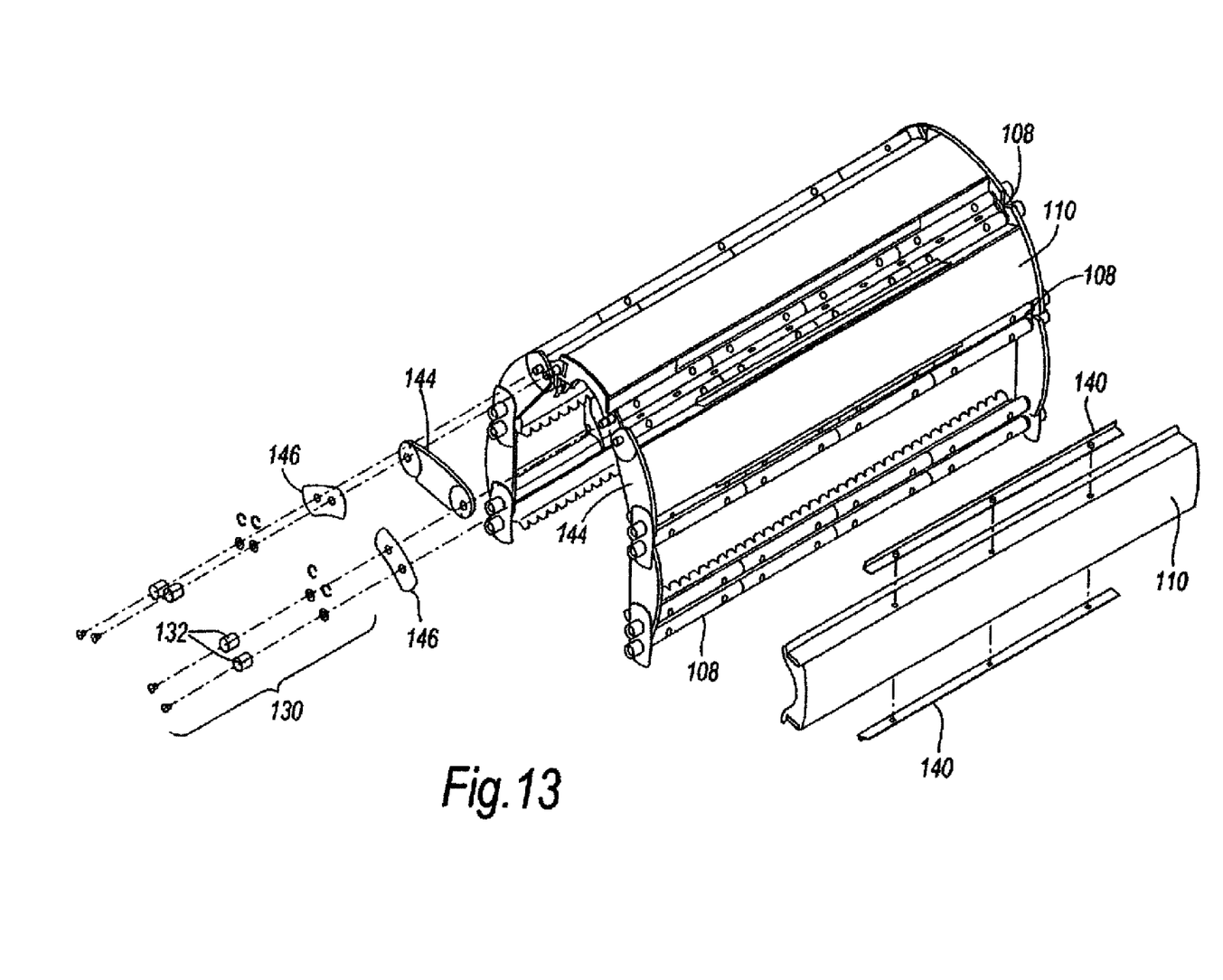
FIG. 13 is a diagrammatic exploded isometric view of the top section of the grit elevator of FIG. 5.

FIG. 13 is a part-exploded view of a portion of the grit elevator 30 illustrating how the links 108 and screens 110 are formed into the grit elevator 30. Each screen 110 is sandwiched between a pair of links 108 with tubular screen engaging members 122 and 124 each engaged with a respective channel 142 of a screen 110. The links 108 are held in position relative to the screens 110 by means of a chain link 144 mounted on pairs of the spigots 126. The space between two spigots 126 at the end of each link 108 is then bridged by a spacer plate 146. The chain links 144 and spacer plates 146 are held in position by the roller assembly 130 which is then bolted into place.

In this embodiment, each chain link 144 is of a plastics or polymer material, eg nylon, with stainless steel insert plates and with whose ends have a recess with circular inner circumferences in which the ends of the stainless steel spacer plates 146 fit to form the articulating chain drives 104 and 106. The chain links 144 and insert plates provide a level surface which seal against sidewalls 160 (see FIG. 14) of the grit elevator assembly 30.

Figure 14:
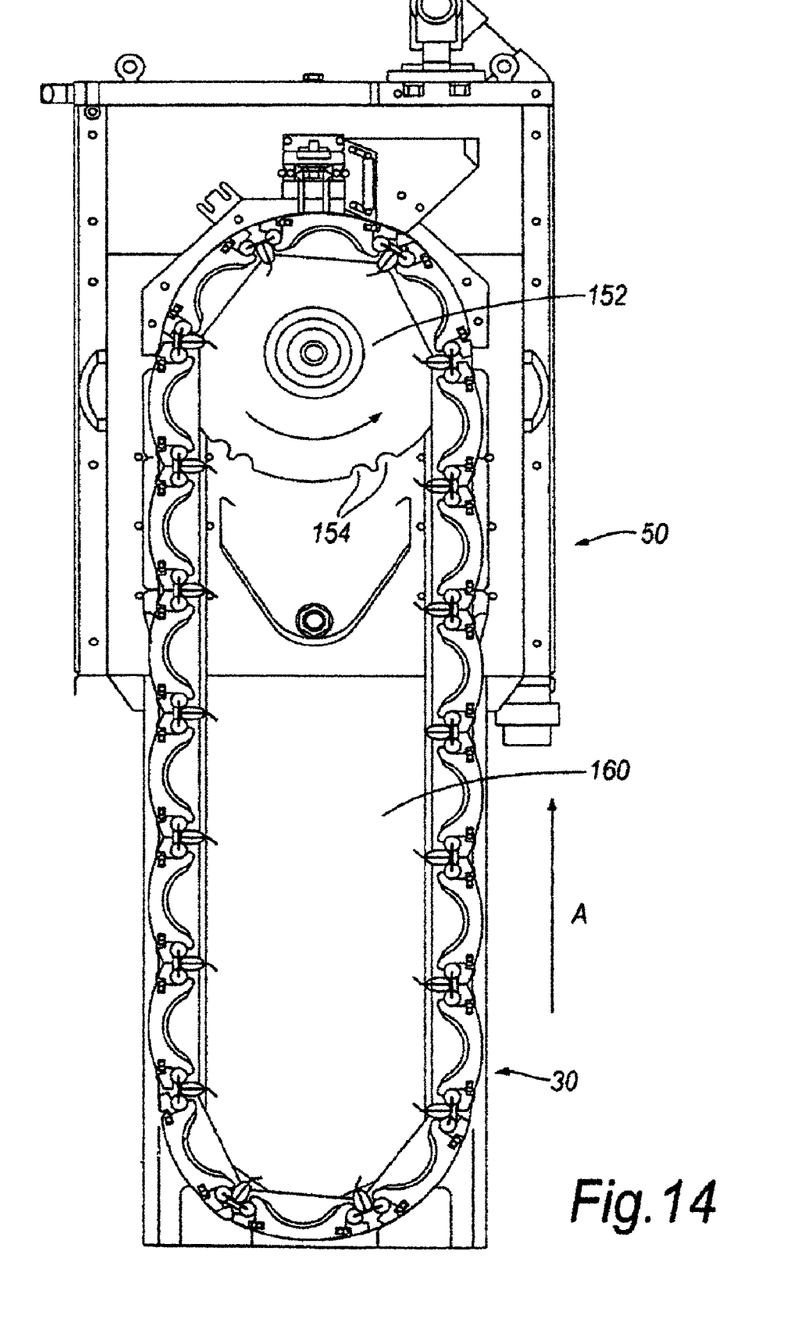
FIG. 14 is a diagrammatic end view of a grit elevator assembly incorporating the grit elevator of FIG. 5.

FIG. 14 shows the grit elevator 30 in place in a grit elevator assembly 50 which is supported by a pair of motor driven drive wheels (one, only, visible) which have pairs of peripheral indents spaced and dimensioned to engage with the pairs of rollers 132 at each end of each link 108. As a drive wheel 152 is rotated indents 154 in the drive wheel 152 engage with the rollers 132 and so the grit collectors 16 are pulled upwards as indicated by arrow A. As the screens are not attached to the links 188 no upward driving force is passed from one screen 110 to the next.

Referring now to FIGS. 15 to 19 there are illustrated elements of further embodiments of grit elevator 30.

Figure 15:
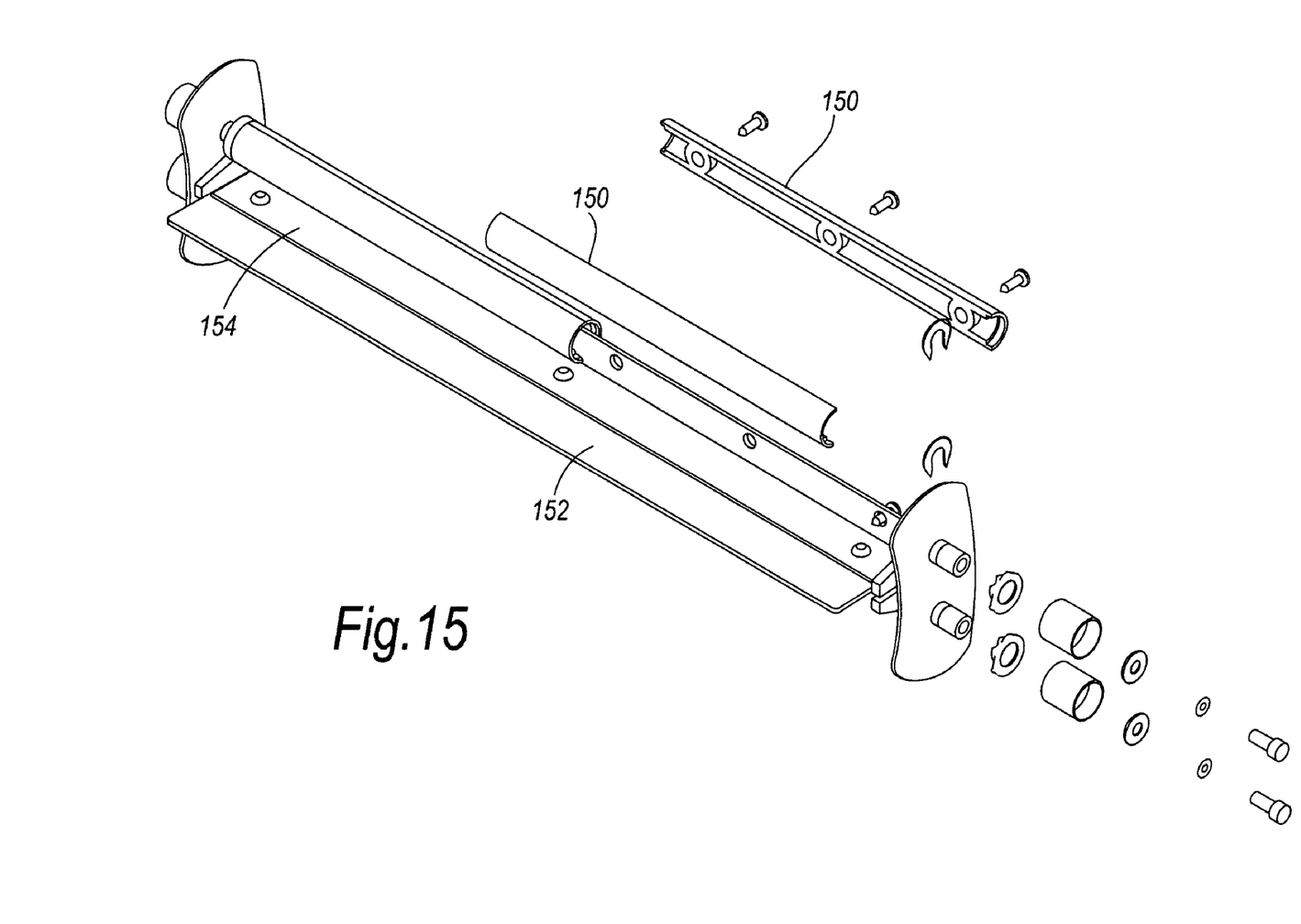
FIG. 15 is a diagrammatic exploded isometric view of an alternative screen-supporting member.

Referring to FIG. 15 there is shown an alternative construction of link which differs from that of FIG. 7 in that the split tubes 118 are replaced by two-part cylindrical sections 150 which are mountable on the plate 114 by means of bolts 120. Also the grit collector 116 of FIG. 7 is replaced by a grit collector 152 with a straight outer edge fixed between a pair of flanges 154 by means of nut and bolts 156, as is more clearly seen in FIG. 16.

Figure 16:
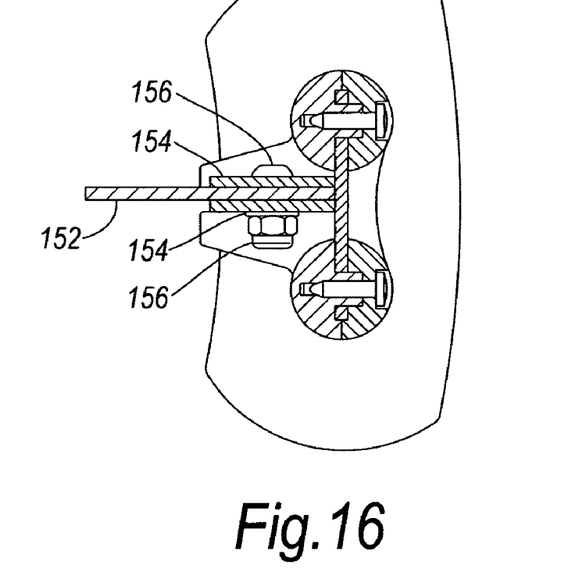
FIG. 16 is a diagrammatic cross-sectional view of the screen-supporting member of FIG. 15.
Figure 17:
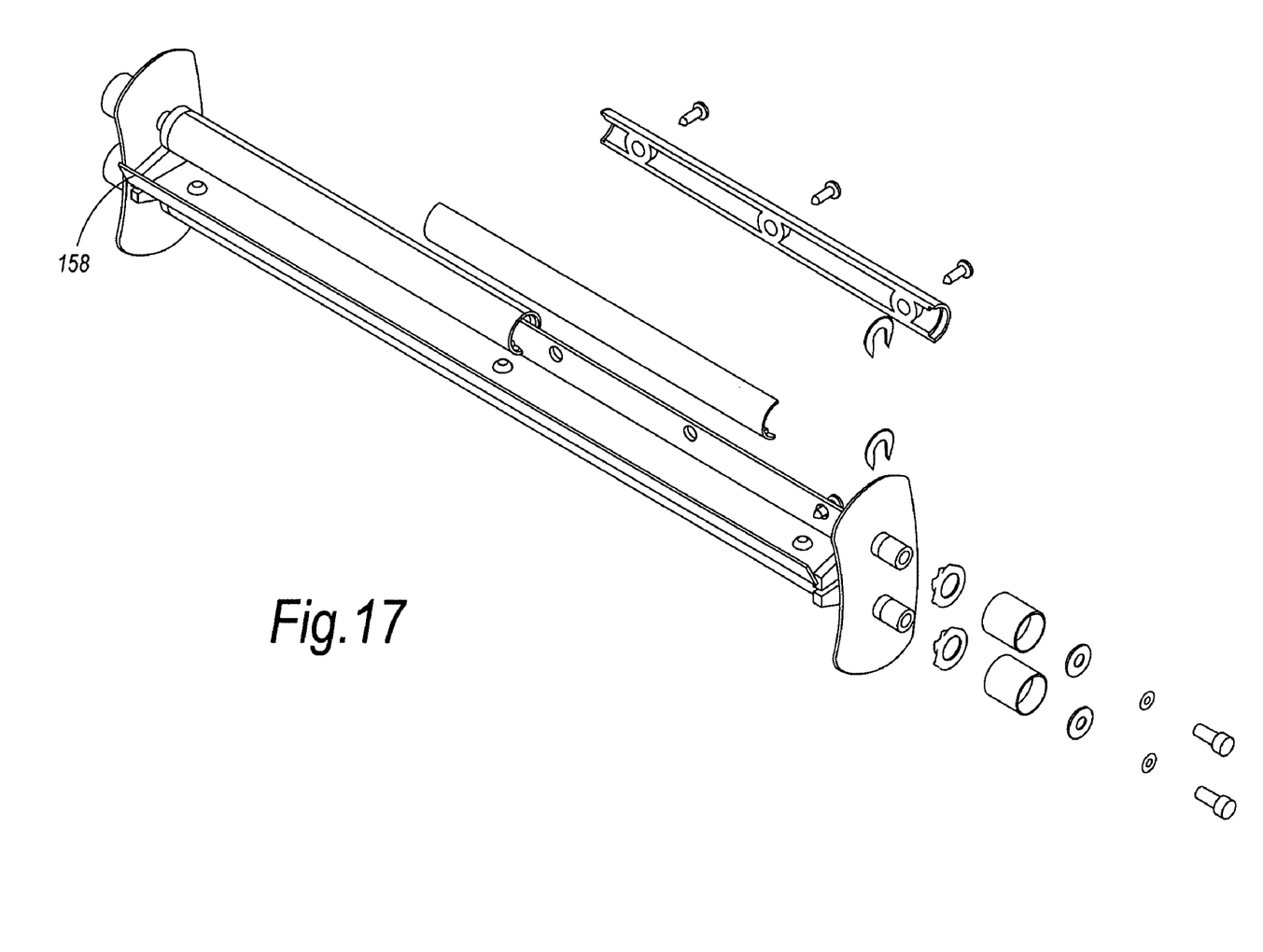
FIG. 17 is a diagrammatic isometric view of a further alternative screen-supporting member.
Figure 18:
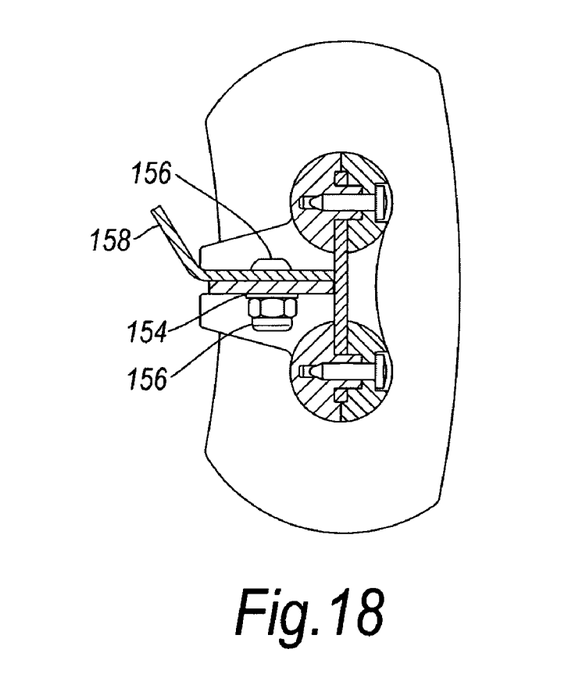
FIG. 18 is a diagrammatic cross-sectional view of the screen-supporting member of FIG. 17.

A further embodiment of grit collector is shown in FIGS. 17 and 18 which is as shown in FIGS. 15 and 16 except the flat plate 152 of FIG. 15 and 16 is replaced by a plate with an outer, angled end portion 158.

Figure 19:
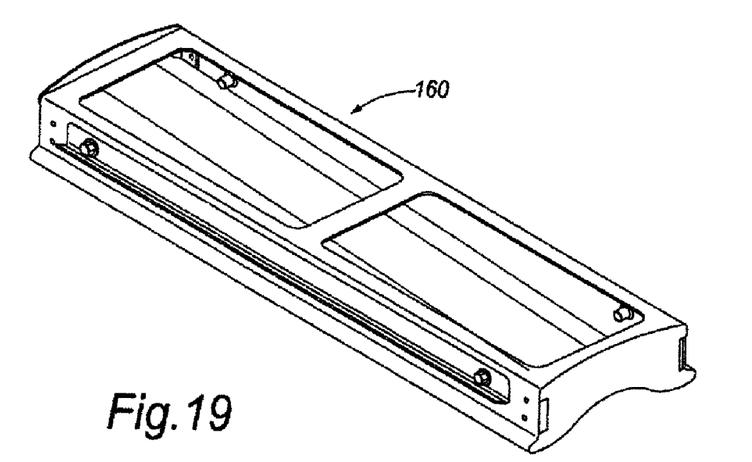
FIG. 19 is a diagrammatic isometric view of an alternative screen.
Figure 20:
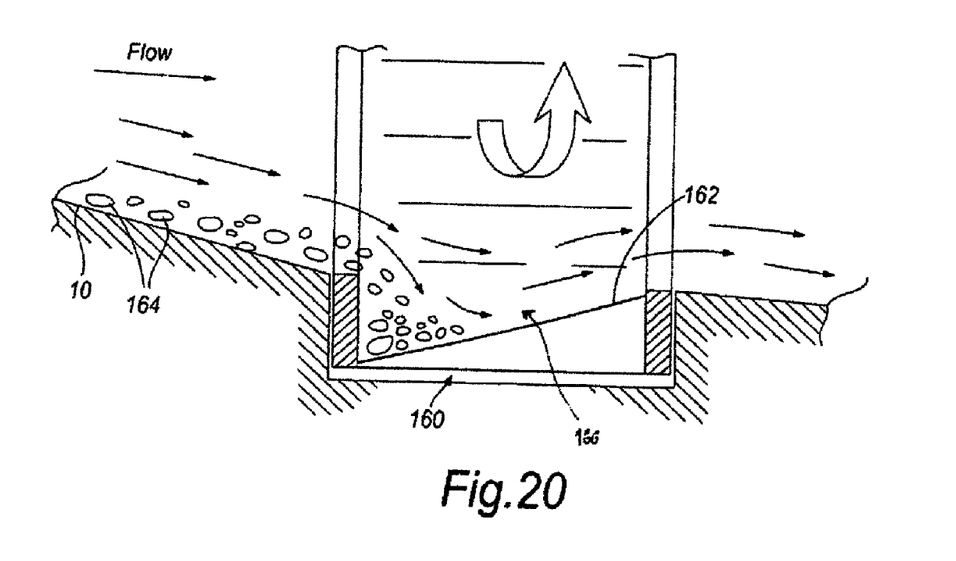
FIG. 20 is a diagrammatic sketch showing the operation of the screen of FIG. 19.

This form of grit collector 158, as well as these of FIG. 9, may be used with a blank screen 110 as shown in FIG. 11 or an alternative form of blank screen 160 as shown in FIG. 19, which is as that of FIG. 11 except for the configuration of the interior of the blank screen. As shown in FIG. 20, the blank screen of FIG. 19 has an angled interior bottom 162. Stones and grit 164 tumble down the floor 10 of the grit chamber 6 into a "bucket" volume 166 formed in the interior of the screen 110 by the angled interior bottom 162. The liquid and screenings flow through the grit elevator, the flow being aided by the upward slope of the interior angled screen plate 162 The grit and stones 164 settle in the "bucket" volume due to the velocity drop/volume increase of the liquid in the bucket volume. The upward slope of the angled screen plate 162 also acts to wash the screenings into the liquid flow so they exit the grit elevator.

Figure 21:
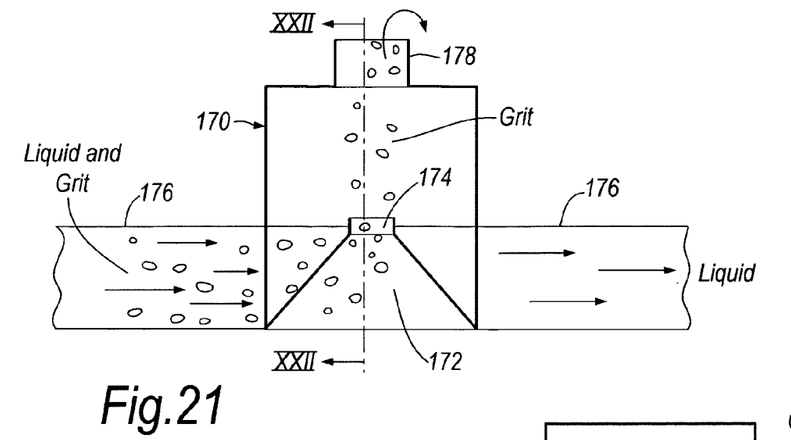
FIG. 21 is a diagrammatic isometric view of a further arrangement of grit separator coupled a further embodiment of a grit elevator according to the present invention.
Figure 22:
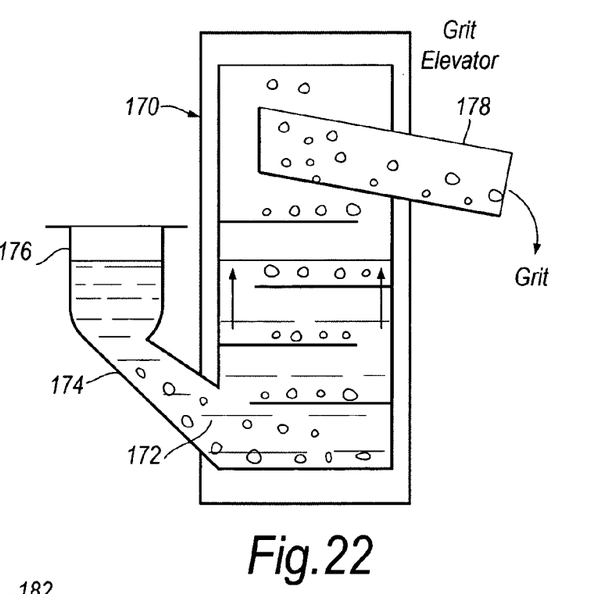
FIG. 22 is a diagrammatic cross-sectional view of the arrangement of FIG. 21.
Figure 23:
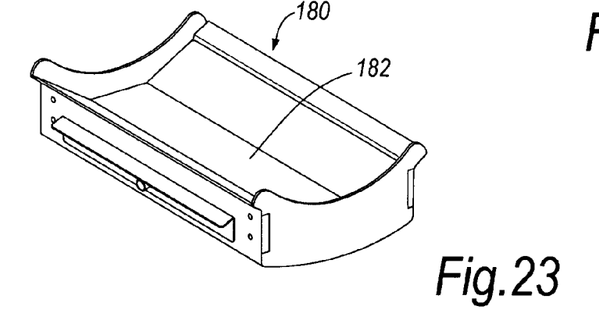
FIG. 23 is a diagrammatic isometric view of an alternative screen of the grit elevator of FIGS. 21 and 22.

Referring now to FIGS. 21 and 22 there is shown, schematically a further embodiment of grit elevator 170 according to the present invention which is as that illustrated in FIG. 5 except there is no aperture to allow the outflow of waste water through the grit elevator and it has screens as shown in FIG. 23.

The grit elevator 170 has an inlet 172 coupled to an ascending input conduit leading to the bottom of a waste water conduit 176. As the grit elevator 170 doesn't allow a flow through of water there is a water level in the grit elevator level determined by that of the water in the waste water conduit 176. The flow is such that grit is moved along the bottom of the conduit 176 as shown in FIG. 21 until it reaches and falls down the conduit 174 to enter the interior of the grit elevator 170 whereupon the grit is removed as described with reference to the previously described embodiments of grit elevator via a discharge trough 178.

As there is no water flow into the grit elevator 70 there is no requirement for the screens with sloped bottoms as shown on FIG. 19, rather a screen 180 with non-sloping bottom 182 as shown in FIG. 23 may be used.

In use, the grit that has entered the bottom interior of a grit elevator according to the present invention is picked up by a grit collector 158 and lifted upwards as the endless belt of screens is rotated. As the grit collectors 158 are moved across the top of the endless belt they are inverted in turn and the grit lifted by a grit collector 158 falls under gravity into a discharge trough 178, for example.

The invention claimed is:
1. A grit elevator including:
a plurality of solid screens in the form of a rotatable endless belt;
one or more grit collectors fixed to the interior of the endless belt; and
a grit inlet leading to the interior of the endless belt, said endless belt including:
a pair of spaced-apart, endless drive chains;
a plurality of spaced-apart screen-supporting members each spanning between the drive chains; and
a plurality of screens each of which is held in position by being engaged with, but not attached to, a respective pair of the screen-supporting members, only.

2. A grit elevator as claimed in claim 1, in which each screen-supporting member includes a pair of spaced-apart, at least part-cylindrical, screen engaging means.

3. A grit elevator as claimed in claim 2, in which each screen engaging means comprises a split cylindrical tube which is removably attached to a plate engaged with the slot.

4. A grit elevator as claimed in either one of claim 2 or 3 in which each of said screens includes a pair of screen-supporting member engaging means each engageable with a screen engaging means.

5. A grit elevator as claimed in claim 4, in which each screen-supporting member engaging means comprises a channel.

6. A grit elevator as claimed in claim 5, in which each channel includes two opposed, generally planar side walls which diverge in the direction away from screen.

7. A grit elevator as claimed in claim 6, in which one of the sidewalls is a flange of a plate which is removably fastened to screen.

8. A grit elevator as claimed in claim 1 in which the grit collectors are part of respective screen-supporting members.

9. A grit elevator as claimed in claim 1, in which the grit collector comprises a plate.

10. A grit elevator as claimed in claim 9, in which the plate is arcuate.

11. A grit separator assembly including a grit elevator as claimed in claim 1 and a grit separator including a main conduit having an outlet conduit leading from the bottom of the main conduit downwards to the grit inlet of the grit elevator.

12. A grit elevator including:
   a plurality of solid screens in the form of a rotatable endless belt;
   one or more grit collectors fixed to the interior of the endless belt;
   a grit inlet leading to the interior of the endless belt; and
   a grit separator including a main conduit having an outlet conduit leading from the bottom of the main conduit downwards to the grit inlet of the grit elevator.

* * * * *